(12) United States Patent
Olson et al.

(10) Patent No.: US 7,823,651 B2
(45) Date of Patent: Nov. 2, 2010

(54) TRIP MECHANISM FOR A GROUND WORKING TOOL

(75) Inventors: Duane Olson, Saskatoon (CA); Blake Neudorf, Warman (CA); Warren Garth Schierling, Saskatoon (CA)

(73) Assignee: CNH Canada, Ltd. (CA)

( * ) Notice: Subject to any disclaimer, the term of this patent is extended or adjusted under 35 U.S.C. 154(b) by 218 days.

(21) Appl. No.: 12/050,657

(22) Filed: Mar. 18, 2008

(65) Prior Publication Data

US 2009/0236105 A1 Sep. 24, 2009

(51) Int. Cl.
*A01B 61/04* (2006.01)
(52) U.S. Cl. .................................................. 172/260.5
(58) Field of Classification Search .................. 37/231, 37/232; 172/264–268, 705, 166, 269, 709–711, 172/748, 558, 604, 260.5, 261, 263
See application file for complete search history.

(56) References Cited

U.S. PATENT DOCUMENTS

| 397,962 | A | | 2/1889 | Bird |
| 2,094,515 | A | | 9/1937 | Abbe |
| 3,528,504 | A | | 9/1970 | Bushmeyer |
| 3,536,141 | A | * | 10/1970 | Woelfel ....................... 172/234 |
| 3,559,744 | A | | 2/1971 | Olinger |
| 4,209,067 | A | | 6/1980 | Poggemiller et al. |
| 4,660,652 | A | * | 4/1987 | Moos et al. .............. 172/260.5 |
| 4,921,225 | A | | 5/1990 | Ludwig |
| 5,234,060 | A | | 8/1993 | Carter |
| 5,450,908 | A | | 9/1995 | Hagman et al. |
| 5,641,026 | A | * | 6/1997 | Balmer ....................... 172/452 |
| 5,921,010 | A | | 7/1999 | Schulte et al. |
| 5,979,918 | A | * | 11/1999 | Okashita et al. ........ 280/93.515 |
| 5,988,291 | A | | 11/1999 | Yeomans |
| 6,955,131 | B2 | * | 10/2005 | Beaujot et al. .............. 111/187 |

FOREIGN PATENT DOCUMENTS

EP 0516004 A2 5/1991

* cited by examiner

*Primary Examiner*—Robert E Pezzuto
(74) *Attorney, Agent, or Firm*—Rebecca Henkel

(57) ABSTRACT

A system and method for operating a ground working tool having attached thereto an implement includes a trip mechanism. The trip mechanism includes a generally horizontally oriented hydraulic cylinder configured to be biased into an extended position to engage the implement in a work position engaged to work the ground. Specifically, a link rod connects the hydraulic cylinder to a carrier to which the implement is attached. The link rod can be adjusted in length and has a generally small diameter, such that, upon extending into hydraulic cylinder when the implement impacts an obstruction, the link rod does not contact the hydraulic cylinder.

5 Claims, 2 Drawing Sheets

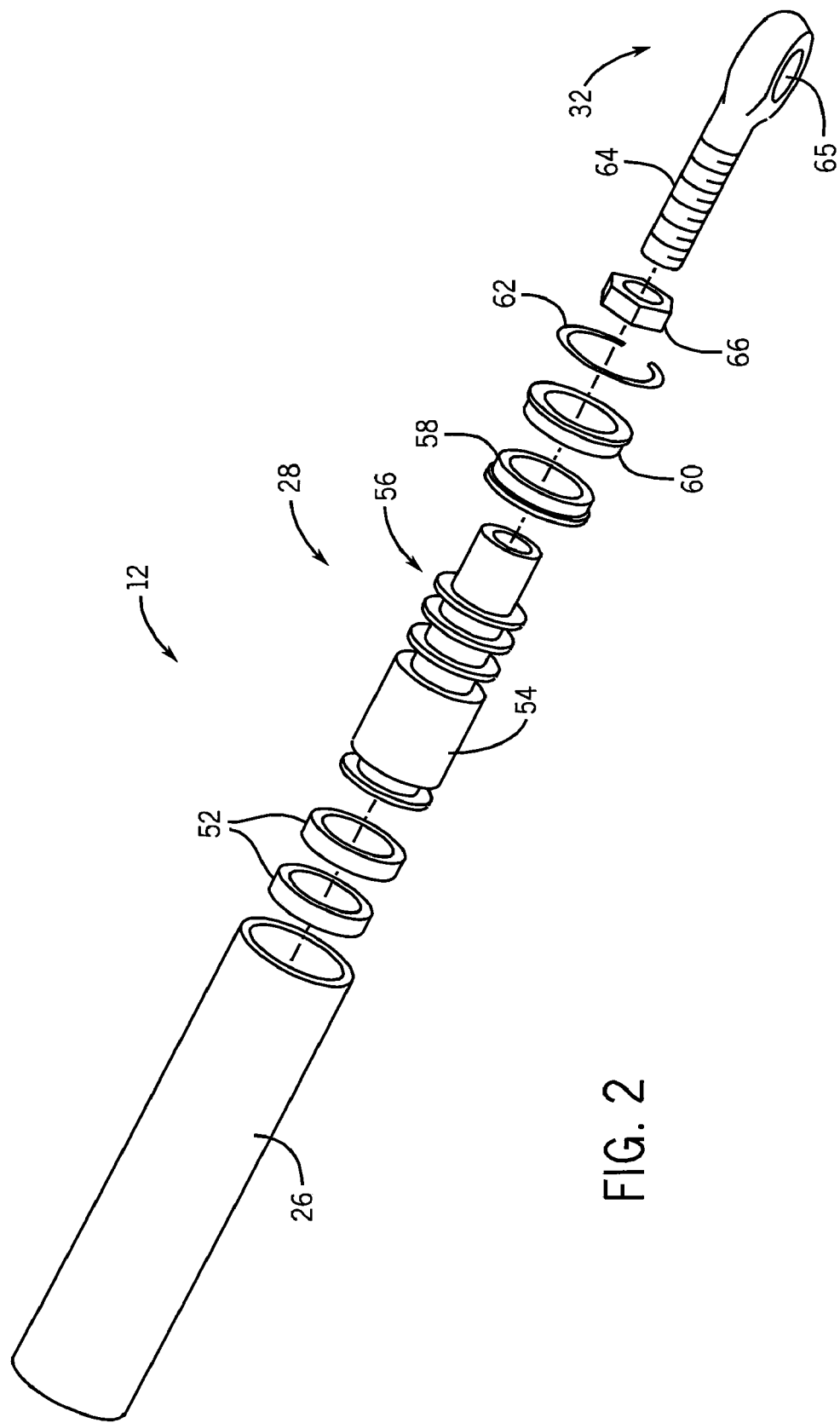

TRIP MECHANISM FOR A GROUND WORKING TOOL

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates generally to trip mechanisms and, in particular, to a trip mechanism used for ground working tools of an agricultural implement.

BACKGROUND OF THE INVENTION

Ground working tools such as plows, discs, rakes, plows and the like, used with agricultural vehicles such as tractors, skid loaders, combines, and the like, are ubiquitous in the agricultural industry. As an agricultural vehicle towing a ground working tool travels across a field, agricultural processes such as digging, scraping, plowing, plating, and/or fertilizing are performed. However, such tools are vulnerable to damage resulting from collisions with debris such as rocks, trees, and the like. Manufacturers of such tools have worked for years to produce ground working tools that are responsive and easily retractable so that the tools do not suffer damage when obstructions are encountered during such activities.

Ground working tools described above typically include some sort of trip mechanism designed to allow the tool to change from an operating, "untripped" position to a non-operating, "tripped" position in the face of a collision with an obstacle. These trip mechanisms typically include coiled springs configured to allow the tool to yield when obstacles are encountered. However, springs that are fully exposed to the elements may cause the springs to stick due to accumulation of dirt and debris in and around the springs. Further, exposure to the elements can cause the springs to rust and/or corrode due to continued exposure to harsh conditions.

Additionally, these spring-based systems typically have a fixed or very difficult to adjust "trip-out" force. That is, the amount of force required to cause the system to trip is difficult or impossible to adjust. This is a significant limitation of such systems since field conditions can vary significantly from field to field or season to season.

Accordingly, some systems combine hydraulic cylinders with springs for automatically tripping the tool away from the obstruction while providing a variable trip-out force by adjusting the pressure in the hydraulic cylinder. However, this type of mechanism can result in overpressure conditions, requiring the operator to manually recharge the hydraulic cylinder to its predetermined pressure setting, which can be a time-consuming procedure.

Additionally, hydraulic cylinders are significantly more costly to manufacture, maintain, and replace than springs. For example, for proper operation, it is important to maintain clean, smooth surfaces along the sliding surfaces of the cylinders and protect against damage to the chrome, nitride coated surfaces, seals, and the like. The costs associated with such maintenance is compounded by the fact that as many as 80 or 90 individual cylinders may be incorporated into a given system.

In an effort to control costs, the cylinder for hydraulic trip systems are typically "single acting" cylinders with no over extending limitations. The trip system is designed to have a limiting geometry so the cylinder maintains an appropriate working geometry. However, this design exposes the rod end of the cylinder when in the untripped position because in this working position the cylinder must be extended. Furthermore, this design forces the cylinder to be in a vertical orientation in an attempt to prevent dust and dirt build up on the cylinder. Accordingly, the design requires an adjustment system for the shank to be built into the trip. Because of these design restrictions, the trip system becomes cumbersome in size and more costly to build. A large tip size is a significant drawback when mounting 80, 90, or more trips systems on an air drill frame.

As a result, a need exists for a trip mechanism for a ground working tool which effectively protects the tool from obstructions while simultaneously allowing quick and easy adjustment of trip mechanism.

SUMMARY OF THE INVENTION

The present invention overcomes the aforementioned drawbacks by providing an improved trip mechanism for a ground working tool that protects the tool, protects the trip mechanism, and is convenient and easy to operate, adjust and maintain.

In accordance with one aspect of the invention, a trip mechanism for a ground working tool is disclosed. The ground working tool includes a carrier extending from a frame and an implement that is rigidly connected to the carrier to be engaged with the ground as an agricultural vehicle pulls the ground working tool over the ground defining a generally horizontal plane. The trip mechanism includes a hydraulic cylinder including a barrel connected at a first end to the frame and a piston having a piston head and a piston shaft. The piston is configured to be slidably received through a second end of the barrel to move within the barrel. The barrel extends from the first end to the second end along a line having a primary component of direction parallel to the generally horizontal plane. The trip mechanism also includes a link rod having a first end removably connected to the piston and a second end removably connected to the carrier. The hydraulic cylinder is biased to have the piston arranged proximate to the second end of the barrel in a working position and is configured be moved toward the first end of the barrel and move the link rod to at least partially extend into the barrel in a tripped position.

Additionally, the link rod may have a smaller diameter than the piston.

Furthermore, the link rod may have a smaller diameter than the piston shaft.

Also, the first end of the link rod may be removably connected to the piston shaft.

In addition, a length of the link rod extending between the piston and the carrier may be adjustable.

Further still, the link rod may include a threaded portion and a lock nut may be included that is configured to be movable over the threaded portion to select a length of the link rod extending between the piston and the carrier.

Additionally, the link rod may have a primary component of direction parallel to the generally horizontal plane.

Also, movement of the piston and the link rod from the second end of the barrel toward the first end of the barrel may cause reciprocal motion of the implement at least partially perpendicular to the generally horizontal plane.

A snap ring may be connected to retain the piston head within the barrel when proximate to the second end of the barrel.

In accordance with another aspect of the invention, a trip mechanism for a ground working tool is disclosed. The ground working tool includes a carrier extending from a frame and an implement rigidly connected to the carrier to be engaged with the ground as an agricultural vehicle pulls the ground working tool over the ground defining a generally horizontal plane. The trip mechanism includes a hydraulic cylinder having a barrel connected at a first end to the frame and a piston having a piston head with a diameter approximately equal to a diameter of an interior of the barrel. The piston also includes a piston shaft having a diameter less than the piston head and is configured to be slidably received through a second end of the barrel to move within the barrel. The trip mechanism also includes a link rod having a first end removably connected to the piston shaft and a second end removably connected to the carrier. Furthermore, the link rod has a diameter less than the diameter of the piston shaft. The hydraulic cylinder is biased to have the piston arranged proximate to the second end of the barrel in a working position and is configured to be moved toward the first end of the barrel to move the link rod to at least partially extend into the barrel in a tripped position.

Additionally, the barrel may extend from the first end to the second end along a line having a primary component of direction parallel to the generally horizontal plane.

Furthermore, the link rod may have a primary component of direction parallel to the generally horizontal plane.

Also, movement of the piston and the link rod from the second end of the barrel toward the first end of the barrel may cause reciprocal motion of the implement at least partially perpendicular to the generally horizontal plane.

In addition, a length of the link rod extending between the piston and the carrier may be adjustable.

Further still, the link rod may include a threaded portion and a lock nut may be provided that is configured to be movable over the threaded portion to select a length of the link rod extending between the piston and the carrier.

Also, a snap ring may be connected to retain the piston head within the barrel when proximate to the second end of the barrel.

Additionally, a coupling assembly may connect the link rod to the carrier.

In accordance with another aspect of the invention, a method of controlling a trip mechanism for a ground working tool is disclosed. The ground working tool includes a carrier extending from a frame and an implement that is rigidly connected to the carrier to be engaged with the ground as an agricultural vehicle pulls the ground working tool over the ground defining a generally horizontal plane. The method includes connecting a hydraulic cylinder including a barrel connected at a first end to the frame and arranging a piston having a piston head with a diameter approximately equal to a diameter of an interior of the barrel within the barrel. The piston includes a piston shaft having a diameter less than the piston head and is configured to be slidably received through a second end of the barrel to move within the barrel. The method also includes connecting a link rod having a diameter less than the diameter of the piston shaft at a first end to the piston shaft and connecting the link rod at a second end to the carrier. The method further includes biasing the piston head toward the second end of the barrel to arrange the implement in a working position and allowing the piston to be displaced toward the first end of the barrel and the link rod to at least partially extend into the barrel to allow the implement to move to a tripped position away from the work position when the implement intersects an obstacle on the ground.

The method may also include adjusting a length of the link rod by at least rotating a locking nut along a threaded portion of the link rod.

Additionally, the method may include positioning a snap ring in the barrel proximate to the second end to retain the piston head within the barrel when proximate to the second end of the barrel.

BRIEF DESCRIPTION OF THE DRAWINGS

FIG. 2 is an exploded perspective view of the trip mechanism of FIG. 1.

DETAILED DESCRIPTION OF THE EXAMPLE EMBODIMENTS

Figure 1:
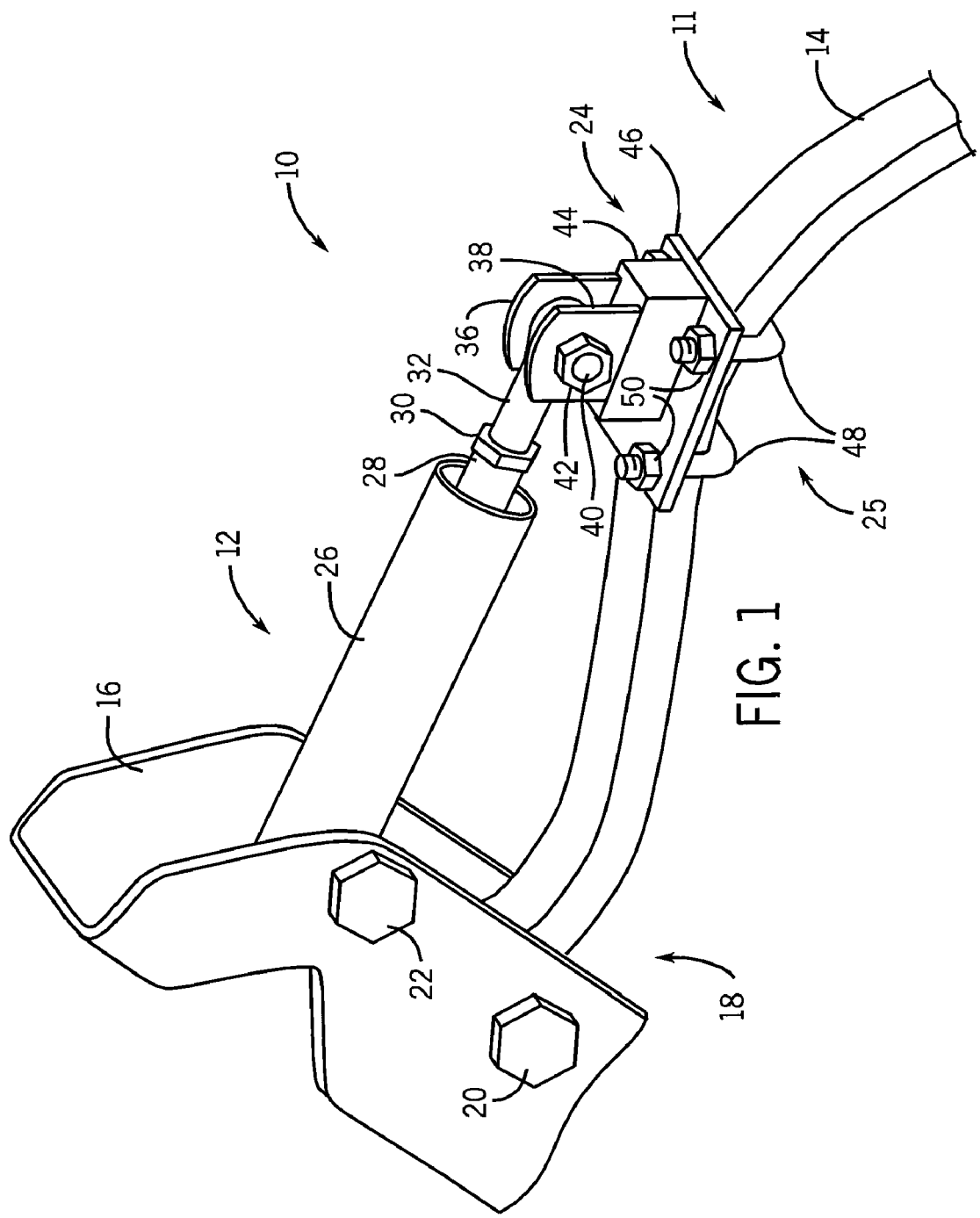
FIG. 1 is a perspective view of a trip mechanism in accordance with the present invention attached to a ground working tool.

Referring to FIG. 1, a trip mechanism 10 for a ground working tool or implement 11 includes a hydraulic cylinder 12. The trip mechanism 10 may be used with any agricultural vehicle operating any ground-working tool or implement (not shown), such as a blade, connected to carriage 14 extending from frame 16. Although only one trip mechanism 10 and implement 11 is shown, it is understood that agricultural systems typically utilize a series of implements 11 having associated trip mechanisms 10 that are pulled by an agricultural vehicle. Furthermore, it is contemplated that a particular implement may have more than one trip mechanism 10 associated therewith. Additionally, it is contemplated that an associated agricultural vehicle may provide a source of fluid or oil for the hydraulic cylinder 12.

The hydraulic cylinder 12 of the trip mechanism 10 and the carriage 14 are mounted at a first end 18 to the frame 16 through respective pivot points 20, 22. The trip mechanism 10 and the carriage 14 extend away from the first end 18 and are connected together through a coupling assembly 24 at a second end 25. More specifically, the hydraulic cylinder 12 extends away from the first end 18 through a barrel 26 and, extending therefrom, a piston 28. The piston is connected through a lock nut 30 to a link 32 that, as will be described, is threaded to engage the piston 28 through the lock nut 30.

The link 32 engages the coupling assembly 24 that connects the hydraulic cylinder 12 and link 32 to the carriage 14. In particular, the coupling assembly 24 includes a pair of opposing side walls 36, 38 and a shaft 40 extending between the side walls 36, 28 and through the link 32 to pivotably connect the link thereto. The shaft 40 is locked in this arrangement using a nut 42 or similar locking mechanism. The opposing side walls 36, 38 extend upward from a mounting stand 44 arranged atop a mounting plate 46. The mounting plate 46 is designed to engage the carriage 14 and be secured thereto through one or more U-brackets 48 that extend around the carriage 14 and through the mounting plate 46. To this end, the U-brackets include a threaded portion that extends above the mounting plate 46 to receive a nut 50 or similar fastening mechanisms.

As described with respect to FIG. 1, the trip mechanism 10 includes a hydraulic cylinder 12 engaged to the frame 16 and an adjustable, threaded link rod 32. Referring now to FIG. 2, the hydraulic cylinder 12 and connection to the link 32 is shown in further detail. Specifically, the hydraulic cylinder 12, as described above, includes a barrel 26 and piston 28 configured to extend from and retract into the barrel 26.

Additionally, the hydraulic cylinder 12 includes one or more glide rings 52 that engage with the piston 28 and glide forward and rearward within the barrel 26. The piston 28 includes a piston head 54 and a shaft 56 extending therefrom. A pair of seals 58, 60 are designed to engage the piston 28 along the piston shaft 56 to seal the piston head 54 within the barrel 26. A snap ring 62 is included that, as will be described, retains the piston head 54 within the barrel 26.

The link 32 includes a threaded portion 64 and an eye 65. As will be described, the threaded portion 64 is configured to extend into the shaft of the piston 56. On the other hand, the eye 65 is configured to receive the shaft 40 of FIG. 1 to secure the link 32 to the coupling assembly 24 of FIG. 1. As will be described below, the threaded portion 64 of link 32 has a diameter that is less than the diameter of the interior of the barrel 26. In particular, the threaded portion 64 of link 32 preferably has a diameter that is less than the diameter of the either the head 54 or shaft 56 of the piston 28.

By way of the above-described configuration, the hydraulic cylinder 12 is separated at the first end 18 from the carrier 14 by a distance generally the size of the offset between the pivot points 20, 22. The hydraulic cylinder 12 (and link 32) and the carrier extend from the first end 18 in generally common direction away from the frame 16 and gradually taper toward one another to be joined together through the coupling assembly 24 at the second end 25.

Hence, the hydraulic cylinder 12 is arranged in a generally horizontal position. That is, the barrel 26 extends from the first end 18 to the second end 25 along a line having a primary component of direction parallel to the generally horizontal plane parallel to the ground. More particularly, while as described above, the barrel 26 and, hydraulic cylinder 12 in general, extend away from the frame and slightly downward toward the carrier 14, the vector describing the direction of extent from the frame 16 toward the second end 25 and coupling with the carrier 14 has a primary component of direction extending generally horizontally. Said another way, the vertical distance traveled by the hydraulic cylinder 12 and link 32 from the frame 16 to the coupling assembly 24 is significantly less than the horizontal distance traveled by the hydraulic cylinder 12 and link 32 across this same path. However, as will be described below, the design of the hydraulic cylinder 12 and link 32 protect the hydraulic cylinder 12 from damage from debris, dirt, and corrosion and, thereby, allow the hydraulic cylinder 12 to be configured in this generally horizontal position.

Referring to FIGS. 1 and 2, in operation, an agricultural vehicle pulls the frame 14 and, thereby, the trip mechanism 10 and implement 11 across a field. During working operation, the piston 28 is extended from the barrel 26 and is retained therein by the snap ring 62. Accordingly, the trip mechanism 10 does not require a separate system for setting the working geometry of the hydraulic cylinder 12 because the trip mechanism 10 is self-aligning. Furthermore, extended position of the piston 28 and arrangement of the snap ring 62 serves to protect the interior of the barrel 26 from receive dirt or debris during operation of the system. As will be described, the protection of the hydraulic cylinder 12 is further by the design of the link 32.

When the implement 11 engages an impediment to travel, the trip mechanism breaks, whereby the hydraulic cylinder 12 contracts along the generally horizontal direction and allows for reciprocal motion by the implement 11 at least partially in the vertical direction perpendicular to the generally horizontal plane. By designing the threaded portion 64 of link 32 to have a diameter that is less than the diameter of the interior of the barrel 26 and, preferably, a diameter that is less than the diameter of the either the head 54 or shaft 56 of the piston 28, the link 32 will not touch or effect the cylinder 26 or the sealing surfaces as it extends within the cylinder 26. That is, since in the working position the link 32 is exposed, it may suffer from corrosion, damage from impacts, or may experience a buildup of dust or dirt. However, since the link has a diameter that is less than the diameter of the interior of the barrel 26 and, preferably, a diameter that is less than the diameter of the either the head 54 or shaft 56 of the piston 28, the link 32 will not come in contact with the barrel 26 and, thus, will not damage the hydraulic cylinder 12.

Furthermore, should the link 32 become corroded or damaged, it can easily and inexpensively be replaced. This is accomplished by simply removing the nut 42 and shaft 40 to disengage the link 32 from the coupling assembly 24 and then unscrewing the threaded portion 64 from the piston 28 and lock nut 66. Thereafter, a replacement link 32 can be assembled with the system 10 via an inverse process.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A trip mechanism comprising:
   a ground working tool connected to a carriage extending from a frame;
   a hydraulic cylinder comprising a barrel connected at a first end to the frame and a piston having a piston head and a piston shaft, the piston configured to be slidably received through a second end of the barrel to move within the barrel, wherein the barrel extends from the first end to the second end along a line having a primary component of direction parallel to the generally horizontal plane;
   a link rod having a first end removably connected to the piston and a second end removably connected to the carrier; and
   wherein the hydraulic cylinder is biased to have the piston arranged proximate to the second end of the barrel in a working position and be moved toward the first end of the barrel and move the link rod to at least partially extend into the barrel in a tripped position; wherein the link rod has a smaller diameter than the piston; wherein the link rod has a smaller diameter than the piston shaft; wherein the first end of the link rod is removably connected to the piston shaft; wherein a length of the link rod extending between the piston and the carrier is adjustable; wherein the ground working tool engages an impediment to travel; the trip mechanism disengages; whereby the hydraulic cylinder contracts along the generally horizontal direction and allows for reciprocal motion by the ground working tool at least partially in the vertical direction perpendicular to the generally horizontal plane.

2. The trip mechanism of claim 1 wherein the link rod includes a threaded portion and a lock nut configured to be movable over the threaded portion to select a length of the link rod extending between the piston and the carrier.

3. The trip mechanism of claim 1 wherein the link rod has a primary component of direction parallel to the generally horizontal plane.

4. The trip mechanism of claim 1 wherein movement of the piston and the link rod from the second end of the barrel toward the first end of the barrel causes reciprocal motion of the implement at least partially perpendicular to the generally horizontal plane.

5. The trip mechanism of claim 1 further comprising a snap ring connected to retain the piston head within the barrel when proximate to the second end of the barrel.

* * * * *